United States Patent [19]

Boyer et al.

[11] Patent Number: 4,585,216
[45] Date of Patent: Apr. 29, 1986

[54] LINEAR ACTUATOR SUSPENSION SYSTEM

[75] Inventors: Kent R. Boyer, Valencia; Clyde E. Cobb, Lakeview Terrace, both of Calif.

[73] Assignee: HR Textron Inc., Valencia, Calif.

[21] Appl. No.: 616,951

[22] Filed: Jun. 4, 1984

[51] Int. Cl.$^4$ .............................................. F16F 1/00
[52] U.S. Cl. .................................... 267/150; 267/154; 248/608; 74/89.15
[58] Field of Search ...................... 74/89.15, 424.8 R; 248/608; 267/57, 154, 150

[56] References Cited

U.S. PATENT DOCUMENTS

| | | | |
|---|---|---|---|
| 1,173,038 | 2/1916 | Roschanek | 267/57 |
| 2,040,262 | 5/1936 | Kruckenberg et al. | 267/150 X |
| 2,100,057 | 11/1937 | Krebs | 267/154 |
| 2,834,217 | 5/1958 | Bauer | 267/154 |
| 3,242,756 | 3/1966 | Fry | 74/412 TA |
| 3,380,700 | 4/1968 | Wingen | 248/608 |
| 3,853,344 | 12/1974 | Shimoe | 267/154 |

FOREIGN PATENT DOCUMENTS 1346741 11/1963 France .
765892 1/1957 United Kingdom ................ 267/154

Primary Examiner—Lawrence J. Staab
Attorney, Agent, or Firm—Nilsson, Robbins, Dalgarn, Berliner, Carson & Wurst

[57] ABSTRACT

The shaft of a linear actuator driven by a force motor preferably electromagnetic or hydraulic has a bifurcated arm positioned with one of the bifurcations on each side of the shaft and with the opposite end of the arm securely affixed to a torsion bar. The torsion bar has both ends thereof rigidly secured to a frame member. The bifurcations on the arm end contact a hub which defines a pair of side walls that are threadably received upon the end of the shaft. As the shaft reciprocates, a force is generated by the torsion bar colinear with the shaft axis motion which is proportional to the displacement of the shaft.

5 Claims, 2 Drawing Figures

LINEAR ACTUATOR SUSPENSION SYSTEM

FIELD OF THE INVENTION

The invention relates generally to linear actuators or motors and more specifically to a suspension system for providing bidirectional restraint, proportional to the actuator or motor displacement.

BACKGROUND OF THE INVENTION

In the prior art, suspension systems providing bidirectional restraint to a linear actuator have usually included a pair of helical compression springs located one on each side of the shaft or force motor. As a result, adjustment of the apparatus becomes extremely difficult and, in addition, overall length of the device may be excessive, precluding its utilization under many circumstances.

In addition to the utilization of a plurality of compression springs the best prior art known to applicants includes U.S. Pat. Nos. 2,169,850, 2,337,902 and 2,942,459.

SUMMARY OF THE INVENTION

A bidirectional torsion suspension system for a reciprocally movable shaft of a linear actuator or motor including a torsion bar rigidly secured to a frame with arm means rigidly connected at one end of the torsion bar and means provided at the opposite end of the arm connecting the arm to the shaft so that as the shaft moves the torsion bar is deflected in torsion.

DETAILED DESCRIPTION

In many types of linear actuators or motors (hereinafter actuator) particularly those of the electromagnetic or electrohydraulic types, it is necessary to provide an elastic mechanical suspension system for the actuator. Such a system generates a well defined bidirectional force between the stator and the moving output member. As a general rule, the force vector must be applied in a co-linear manner with the axis of motion of the actuator. Secondly, the force magnitude is generally linearly related to the relative displacement of the moving output member and the stator and thirdly, the suspension must be capable of adjustment such that a null or zero magnitude force can be imposed upon the stator for any given relative position. The suspension system as herein disclosed and illustrated in FIGS. 1 and 2 provides the functions above generally described in a simple, compact, reliable manner which utilizes a relatively small amount of additional space as compared to the same device without such a suspension system.

Figure 1:
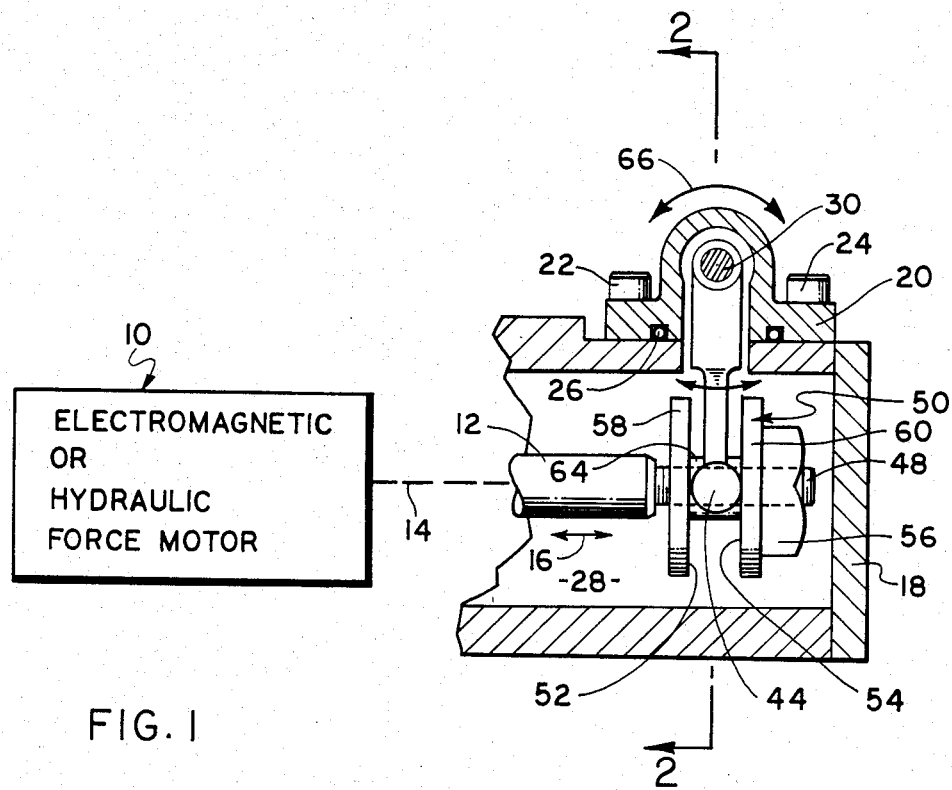
FIG. 1 is a fragmented, schematic diagram partially in cross section of the preferred embodiment of the present invention.

As is shown in FIG. 1, a force motor 10 is mechanically connected to a shaft 12 as is shown by the dash line 14. The force motor, upon the application of signals thereto, reciprocates the shaft 12 as is shown by the arrow 16. Typically, the shaft 12 as well as the motor may be enclosed within a housing, a portion of which is shown at 18.

Attached to the housing 18 is a frame means 20 which may be secured to the housing 18 in any manner desired, such for example as by way of fasteners such as bolts 22 and 24 along with an appropriate seal 26 to contain fluid under pressure within the cavity 28 of the housing.

Figure 2:
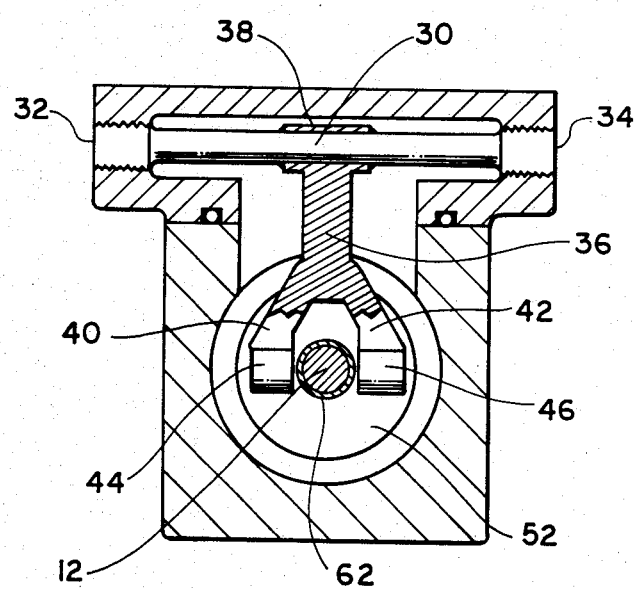
FIG. 2 is a view taken about the lines 2—2 of FIG. 1 thereof.

As shown in FIG. 2, a torsion bar 30 has each of its ends 32 and 34 rigidly secured to the frame 20 as by brazing, welding or the like. An arm 36 has one end 38 rigidly secured intermediate the ends of the torsion bar 30 as by welding or brazing or the like. The opposite end of the arm 36 is bifurcated as shown at 40 and 42 with each of the ends 40 and 42 of the bifurcated arm 36 terminating in a contactor means 44 and 46, respectively. The contactors 44 and 46 are disposed one on each side of the shaft 12.

The end of the shaft 12 is threaded as shown at 48 and a continuous groove defining means 50 is threadably received upon the end 48 of the shaft 12. The means 50 define a pair of opposed side walls 52 and 54 between which the contactors 44 and 46 are received. A lock nut 56 is also threadably received upon the end 48 of the shaft 12 to retain the groove defining means 50 in position relative to the shaft 12.

The groove defining means 50 may include a pair of plates 58 and 60 with a spacer 62 therebetween. To assemble the same, the plate 58 would be threaded into position upon the shaft, the shaft positioned with the wall 52 adjacent the contactor 44. Thereafter, the plate 60 would be positioned upon the shaft as illustrated in FIG. 1 and the lock nut secured in place. Thereafter the plates 58 and 60 and the lock nut 56 would be adjusted to provide the appropriate null position of the shaft 12 with regard to the arm 36.

The groove defining means 50 may also be constructed as a unitary member of spool configuration with a hub 62 having radially extending flanges 58 and 60 extending therefrom to define the groove. This structure would be threaded onto the shaft 12 and after positioning with the arm 36 locked in place with the nut 56.

In operation, as the shaft 12 is reciprocated by the motor 10 the plates 58 and 60 will, through the contactors 44 and 46 move the arm as shown by the arrow 64. As the arm 36 reciprocates responsive to the reciprocation of the shaft 12, the torsion bar 30 is flexed in torsion as shown by the arrow 66. As will be appreciated by those skilled in the art, the greater the movement of the linear actuator shaft 12, the greater the force applied in restraint thereof to the shaft by the flexing in torsion of the torsion bar 30. As will also be appreciated by those skilled in the art, in the absence of the application of force to the shaft 12 by the motor 10 the torsion bar 30 will return the shaft to its null or zero position through application of the forces thereto.

What is claimed is:

1. A force motor having a shaft threaded on one end and linearly movable reciprocally within a housing with respect to a null position responsive to input signals applied thereto and including means for biasing said shaft toward the null position as it reciprocates comprising:

means for defining a pair of opposed spaced apart side walls threadably received on the threaded end of said shaft and adjustable to a predetermined position corresponding to the null position of said shaft;
a frame secured to said housing;
a torsion bar having first and second ends each of which is permanently rigidly secured to said frame;
an arm having first and second ends, the first end of said arm being permanently rigidly secured to said torsion bar intermediate the ends of said torsion bar, the second end of said arm being bifurcated and said bifurcations being disposed one on each side of said shaft and in contact with each of said side walls; and means for locking said side wall defining means at said predetermined position on said shaft.

2. A force motor as defined in claim 1 wherein said means for defining side walls includes first and second plates separated by a spacer, each of said plates being threadably received by said threaded end of said shaft.

3. A force motor as defined in claim 1 wherein said means for defining side walls includes a unitary member having a hub and spaced apart radially outwardly extending flanges threadably received by said threaded end of said shaft.

4. A force motor as defined in claim 2 wherein each of said bifurcations defines a curved surface which contacts each of said plates.

5. A force motor as defined in claim 3 wherein each of said bifurcations defines a curved surface which contacts each of said flanges.

* * * * *